(12) United States Patent
Korthals et al.

(10) Patent No.: US 10,519,344 B2
(45) Date of Patent: *Dec. 31, 2019

(54) ADHESIVE TAPE FOR JACKETING ELONGATE MATERIAL SUCH AS ESPECIALLY CABLE LOOMS AND JACKETING METHOD

(71) Applicants: Brigitte Korthals, Hamburg (DE); Nicolai Böhm, Hamburg (DE); Dennis Seitzer, Hamburg (DE); Michel Mies, Hamburg (DE)

(72) Inventors: Brigitte Korthals, Hamburg (DE); Nicolai Böhm, Hamburg (DE); Dennis Seitzer, Hamburg (DE); Michel Mies, Hamburg (DE)

(73) Assignee: TESA SE, Norderstedt (DE)

( * ) Notice: Subject to any disclaimer, the term of this patent is extended or adjusted under 35 U.S.C. 154(b) by 95 days.

This patent is subject to a terminal disclaimer.

(21) Appl. No.: 15/218,303

(22) Filed: Jul. 25, 2016

(65) Prior Publication Data

US 2016/0333229 A1    Nov. 17, 2016

Related U.S. Application Data

(62) Division of application No. 13/459,641, filed on Apr. 30, 2012, now abandoned.

(30) Foreign Application Priority Data

May 3, 2011   (DE) .......................... 10 2011 075 152

(51) Int. Cl.
  *C09J 5/00*   (2006.01)
  *B29C 63/10*   (2006.01)
  (Continued)

(52) U.S. Cl.
  CPC ................. *C09J 5/00* (2013.01); *B29C 63/10* (2013.01); *C09J 7/21* (2018.01); *C09J 7/38* (2018.01);
  (Continued)

(58) Field of Classification Search
  CPC ............................................... C09J 7/30–387; C09J 133/08–12; C09J 5/00; C09J 7/38; C09J 2433/00;
  (Continued)

(56) References Cited

U.S. PATENT DOCUMENTS

| 5,179,151 | A |   | 1/1993 | Yang |   |
| 5,292,842 | A | * | 3/1994 | Yang | ..................... C08F 220/18 524/556 |

(Continued)

FOREIGN PATENT DOCUMENTS

| DE | 14 19 169 | 12/1995 |
| DE | 1 300 452 | 1/2004 |

(Continued)

OTHER PUBLICATIONS

Benedek I., "Pressure-Sensitive Formulation", 2000, VSP BV, pp. 171-172 (Year: 2000).*

(Continued)

*Primary Examiner* — Jeremy R Pierce
(74) *Attorney, Agent, or Firm* — Norris McLaughlin, P.A.

(57) ABSTRACT

An adhesive tape, especially for wrapping cables, consisting of a preferably textile carrier and of a pressure-sensitive adhesive which is applied on at least one side of the carrier and is in the form of a dried polymer dispersion, the polymer being synthesized from:
  a) 40% to 90% by weight of n-butyl acrylate and/or 2-ethylhexyl acrylate
  b) 0% to 10% by weight of an ethylenically unsaturated monomer having an acid or acid-anhydride function (Continued)

c) 60% to 10% by weight of one or more ethylenically unsaturated monofunctional monomers different from (a) and (b)

d) 0% to 1% by weight of a difunctional or polyfunctional monomer and the pressure-sensitive adhesive comprising between 15 and 100 parts by weight of a tackifier (based on the mass of the dried polymer dispersion).

6 Claims, 7 Drawing Sheets

(51) Int. Cl.
    *C09J 7/38*     (2018.01)
    *C09J 7/21*     (2018.01)
    *B29K 67/00*     (2006.01)
    *B29L 23/00*     (2006.01)

(52) U.S. Cl.
    CPC ..... *B29K 2067/00* (2013.01); *B29L 2023/001* (2013.01); *C09J 2203/302* (2013.01); *C09J 2433/00* (2013.01); *C09J 2467/006* (2013.01); *Y10T 428/2915* (2015.01); *Y10T 442/2754* (2015.04)

(58) Field of Classification Search
    CPC .......... C09J 2203/302; Y10T 428/2852–2896; Y10T 428/2891; Y10T 442/2754; B29C 63/044; B29C 63/06; B29C 63/06508; B29C 63/10; B29C 63/105; B29C 63/12; B29C 63/14; B29C 63/145; B29L 2023/001
    See application file for complete search history.

(56) References Cited

U.S. PATENT DOCUMENTS

| | | | |
|---|---|---|---|
| 2003/0082373 A1 | 5/2003 | Silverberg et al. | |
| 2008/0176996 A1* | 7/2008 | Even | C08F 220/18 524/575.5 |
| 2008/0281005 A1 | 11/2008 | Evan et al. | |
| 2010/0048074 A1* | 2/2010 | Wahlers-Shcmidlin | C09J 7/21 442/60 |
| 2010/0137524 A1 | 6/2010 | Grittner et al. | |
| 2016/0333230 A1* | 11/2016 | Korthals | C09J 7/045 |

FOREIGN PATENT DOCUMENTS

| | | |
|---|---|---|
| DE | 102 29 527 | 10/2004 |
| DE | 103 29 994 | 1/2005 |
| EP | 0 071 212 | 2/1983 |
| EP | 0 994 169 | 4/2000 |
| EP | 1 132 927 | 9/2001 |
| EP | 1 312 097 | 2/2002 |
| EP | 1 315 781 | 6/2003 |
| EP | 1 448 744 | 8/2003 |
| EP | 1 367 608 | 12/2003 |
| EP | 1 378 527 | 1/2004 |
| WO | 2006 108871 | 10/2006 |

OTHER PUBLICATIONS

Creton, C., "Pressure-Sensitive Adhesives: An Introductory Course", Jun. 2003, Materials Research Society, pp. 434-439 (Year: 2003).*

Hu, S., "Studies on the Blend of Polyacrylate Emulsions and Tackifier Resin Emulsions", Chinese Journal of Polymer Science, vol. 14, No. 3 (1996), pp. 261-269 (Year: 1996).*

"Emulsion Polymerization and Emulsion Polymers", edited by Lovell and El-Aasser, John Wiley and Sons, 1997.

Fox, "Influence of Diluent and of Copolymer Composition on the Glass Temperature of a Polymer System"; Tohm & Haas Company, 1956.

ASTM International: Designation: D3330/D 3330M-04; "Standard test method for peel adhesion of pressure-sensitive tape"; published Oct. 2004; pp. 1-6.

ASTM Designation: E 28-99; "Standard test methods for softening point of resins derived from naval stores by ring-and-ball apparatus"; Published Feb. 2000; pp. 1-6.

Creton, C., "Pressure-Sensitive Adhesives: An Introductory Course", Jun. 2003, Materials Research Society, pp. 434-439.

Benedek I., "Pressure-Sensitive Formulation", 2000, VSP BV, pp. 171-172.

Hu, S., "Studies on the Blend of Polyacrylate Emulsions and Tackifier Resin Emulsions", Chinese Journal of Polymer Science, vol. 14, No. 3 (1996), pp. 261-269.

Arizona Chemical, Sylvares TP 300, Product Data Sheet.

* cited by examiner

ADHESIVE TAPE FOR JACKETING ELONGATE MATERIAL SUCH AS ESPECIALLY CABLE LOOMS AND JACKETING METHOD

This application is a division of U.S. Nonprovisional patent application Ser. No. 13/459,641, filed on Apr. 30, 2012, now pending, which, in turn, claims priority of German Patent Application No. DE 10 2011 075 152.1, filed on May 3, 2011, the entire contents of which patent applications are incorporated herein by reference.

The invention relates to an adhesive tape for jacketing elongate material such as more particularly cable looms in motor vehicles, and to methods for jacketing.

Adhesive tapes have long been used in industry for producing cable harnesses. In this application the adhesive tapes serve for the bundling of a multiplicity of electrical leads before installation or when already mounted, in order to reduce the space taken up by the bundle of leads, by means of bandaging, and also, in addition, to obtain protective functions.

The testing and classifying of adhesive tapes for cable jacketing takes place in the motor vehicle industry in accordance with extensive bodies of standards such as, for example, LV 312-1 "Protection systems for wire harnesses in motor vehicles, adhesive tapes; test guideline" (October/2009), as a joint standard of the companies Daimler, Audi, B M W and Volkswagen, or the Ford specification ES-XU5T-1A303-aa (revised version September/2009) "Harness Tape Performance Specification". In the text below, these standards are referred to in abbreviated form as LV 312 and Ford specification, respectively.

The sound-damping effect, the abrasion resistance and the temperature stability of an adhesive tape are determined on the basis of defined test systems and test methods, as described comprehensively in LV 312.

Cable wrapping tapes with film and textile carriers are widespread, being generally coated on one side with various pressure-sensitive adhesives (PSAs).

Cable wrapping tapes are required to meet three principal requirements.
  a. Ease of unwind:
    The product dispensed in roll form must be easily unwindable for simple processing.
  b. Flagging resistance:
    Flagging—in the case of an adhesive tape wound around an element—means the tendency of one end of the adhesive tape to stick up. The cause is the combination of the adhesive's holding power, the stiffness of the carrier and the diameter of the cable loom.
    In use, ends of adhesive tapes must not automatically detach.
  c. Cable compatibility:
    The cable insulation must not become brittle as a result of the influence of the adhesive tape in combination with elevated temperature over a prolonged time period. A distinction is made here, in accordance with LV 312, between four temperature classes T1 to T4, corresponding to 80° C. (also called temperature class A), 105° C. (also called temperature class B(105)), 125° C. (also called temperature class C) and 150° C. (also called temperature class D), which the wrapped cables are required to withstand without embrittlement for more than 3000 hours. It is obvious that temperature classes T3 and T4 impose more stringent requirements on the adhesive tape than the lower classes, T1 and T2. The T1 to T4 classification is decided not only by the cable insulation material but also by the PSA and type of carrier.

Cable wrapping tapes with PSAs based on natural rubber usually exhibit good flagging resistance, but have an unwind force which increases over the storage time, and especially at increasing temperatures. Moreover, they meet only the lower temperature classes for cable compatibility.

Similar characteristics are exhibited by adhesive tapes based on synthetic rubbers (styrene block copolymers) such as SBS/SIS. Even the hydrogenated products are restricted in temperature class.

Furthermore, cable wrapping tapes with PSAs based on UV-crosslinkable polyacrylic esters are encountered. These tapes meet the high temperature classes, but tend towards flagging.

In connection with adhesive tapes for cable jacketing, there are three known patent literature citations that mention acrylates in the form of polymer dispersions:

EP 1 132 927 B1 embraces the use of acrylate compositions in bandaging tapes for cables, with the boundary condition of cable compatibility that is valid in the present case as well. There is express mention of an acrylate compound which can be coated in the form of an aqueous system. The description mentions that the term "compounds" refers to ready-to-process mixtures of polymers with the corresponding additives. There is, however, an absence of any specific indication that the term "additives" also includes resins.

On the contrary, it is in fact mentioned that the temperature stability of the adhesive tape is achieved specifically by factors including the absence of resins.

According to EP 0 994 169 B1 it is frequently necessary to crosslink in order to achieve sufficient cohesion (here in the sense of chemical resistance). This in turn leads in general to a reduction in bond strength and tack. The solution lies in a method for producing adhesive tapes by radiation crosslinking, producing effective cohesion while retaining a high bond strength. The adhesives may also be resin-blended acrylates from dispersion; there are no restrictions on the copolymer composition.

DE 44 19 169 A1 describes a flame-retarded tape for cable jacketing, in which both the carrier and the adhesive comprise flame retardants. In Example 1, explicitly, an adhesive is mixed from raw materials comprising Primal PS 83 D, a dispersion acrylate, Snowtack SE 380 A, a dispersion resin, and flame retardant.

It is an object of the present invention to provide an adhesive tape which in spite of easy unwind has good flagging resistance and at the same time exhibits cable compatibility across all designated temperature classes, and which allows the particularly simple, inexpensive and rapid jacketing of elongate material such as cable looms in motor vehicles.

This object is achieved by an adhesive tape as specified in the main claim. The dependent claims provide advantageous developments of the adhesive tape and methods for employing the adhesive tape.

The invention accordingly provides an adhesive tape, especially for wrapping cables, consisting of a preferably textile carrier and a pressure-sensitive adhesive which is applied on at least one side of the carrier and is in the form of a dried polymer dispersion, the polymer being synthesized from:
a) 40% to 90% by weight of n-butyl acrylate and/or 2-ethylhexyl acrylate b) 0% to 10% by weight of an ethylenically unsaturated monomer having an acid or acid-anhydride function
c) 60% to 10% by weight of one or more ethylenically unsaturated monofunctional monomers different from (a) and (b)
d) 0% to 1% by weight of a difunctional or polyfunctional monomer and the pressure-sensitive adhesive comprising between 15 and 100 parts by weight of a tackifier (based on the mass of the dried polymer dispersion).

The adhesive is a pressure-sensitive adhesive (PSA), in other words an adhesive which even under relatively weak applied pressure allows durable bonding to virtually all substrates and which after use can be detached from the substrate again substantially without residue. A PSA has a permanently pressure-sensitive adhesive effect at room temperature, in other words possessing a sufficiently low viscosity and a high tack, and so the surface of the bonding substrate in question is wetted even with low applied pressure. The bondability of the adhesive derives from its adhesive properties, and the redetachability from its cohesive properties.

Ethyl acrylate preferably forms the monomer (c) or at least part of the monomers (c).

2-Ethylhexyl acrylate preferably forms the monomer (a).

According to another preferred embodiment, the monomer (a) consists of 2-ethylhexyl acrylate and at the same time the monomer (c) or at least part of the monomers (c) consists of ethyl acrylate.

Very preferably, the polymer is synthesized from
(a) 40% to 60% by weight of 2-ethylhexyl acrylate
(b) 0% to 5% by weight of an ethylenically unsaturated monomer having an acid or acid anhydride function
(c) 60% to 40% by weight of ethyl acrylate
(d) 0% to 0.5% by weight of a difunctional or polyfunctional monomer.

Contemplated advantageously as monomers (b) are, for example, acrylic acid, methacrylic acid, itaconic acid, maleic acid, fumaric acid and/or maleic anhydride. Preference is given to acrylic acid or methacrylic acid, optionally to the mixture of both.

Monomers (c) include alkyl (meth)acrylates, preferably $C_1$ to $C_{20}$ alkyl (meth)acrylates with the exception of the monomers forming (a), aromatic vinyl monomers such as styrene, α-methylstyrene and vinyltoluene, $C_1$ to $C_{10}$ hydroxyalkyl (meth)acrylates such as, more particularly, hydroxyethyl or hydroxypropyl (meth)acrylate, vinyl esters of carboxylic acids containing up to 20 carbon atoms, such as vinyl acetate or vinyl laurate, vinyl ethers of alcohols containing up to 10 carbon atoms, such as vinyl methyl ether or vinyl isobutyl ether, vinyl halides such as vinyl chloride or vinylidene dichloride, acid amides such as acrylamide or methacrylamide, and unsaturated hydrocarbons having 2 to 8 carbon atoms such as ethylene, propene, butadiene, isoprene, 1-hexene or 1-octene.

Particularly preferred in accordance with the invention is ethyl acrylate.

Examples of polyfunctional ethylenically unsaturated monomers (d) are divinylbenzene, alkyl diacrylates such as 1,2-ethylene glycol diacrylate, 1,4-butanediol diacrylate, 1,6-hexanediol diacrylate, 1,8-octanediol diacrylate or 1,12-dodecanediol diacrylate, triacrylates such as trimethylolpropane triacrylate and tetraacrylates such as pentaerythritol tetraacrylate.

The polymer dispersion is prepared by the process of emulsion polymerization of the stated components. Descriptions of this process are given for example in "Emulsion Polymerization and Emulsion Polymers" by Peter A. Lovell and Mohamed S. El-Aasser—Wiley-VCH 1997—ISBN 0-471-96746-7 or in EP 1 378 527 B1.

In order to obtain pressure-sensitive adhesive properties, the adhesive at the processing temperature must be situated above its glass transition temperature, in order to have viscoelastic properties. Since cable loom wrapping takes place at normal ambient temperature (approximately between 15° C. to 25° C.), the glass transition temperature of the PSA formulation (polymer/tackifier mixture) is preferably below +15° C. (determined by DSC (Differential Scanning calorimetry) in accordance with DIN 53 765 with a heating rate of 10 K/min).

The glass transition temperature of the acrylate copolymers can be estimated in accordance with the equation of Fox from the glass transition temperatures of the homopolymers and their relative proportions (cf. T. G. Fox, Bull. Am. Phys. Soc. 1 (1956) 123). The tackifiers raise the glass transition temperature automatically, depending on amount added, compatibility and softening temperature, by around 5 to 40 K. Consequently, only acrylate copolymers having a glass transition temperature of 0° C. at most are suitable.

Preference is given additionally to polymers which in addition to the comonomer composition of the invention have a bond strength to steel in accordance with ASTM D3330 of at least 1.0 N/cm (for an adhesive coatweight of 30 g/m² on a 23 μm polyester film carrier).

In the wrapping of a cable loom, the adhesive tape is bonded with from no overlap at all to complete overlap around the cable, the radius of which is generally small, meaning that the adhesive tape is very sharply curved. At the end of a wrapped section, the tape is typically wrapped primarily onto its own reverse face, so that the degree of overlap is virtually complete, similar to the customary presentation form of an adhesive tape roll, where the adhesive is likewise bonded to its own reverse face. In the event of flagging, static forces are acting, such as, for example, through the flexural stiffness of the carrier and the wrapping tension, and may result in the open ends of adhesive tape standing up undesirably, similar to the start of automatic unwinding. The flagging resistance, then, is the capacity of the adhesive to resist this static force.

The polymer dispersion alone does not meet the requirements imposed on an adhesive tape for wrapping cables. In particular, the required flagging resistance is insufficient.

The use of tackifiers for the purpose of raising the bond strengths of PSAs is known in principle. For the skilled person it is therefore obvious to improve the flagging resistance by using tackifiers. Precisely this effect is observed if the adhesive is admixed typically with 15 to 100 parts by weight of tackifiers (based on the solids), usually 20 to 80 parts by weight, more preferably 30 to 50 parts by weight.

Surprisingly and unforeseeably for the skilled person, the use of tackifier resins in the case of the adhesive tape of the invention does not lead at the same time to difficult unwind, despite the fact that a common factor of the two requirements is that the PSA has contact with its own reverse face.

Suitability as tackifiers, also referred to as tackifier resins, is possessed in principle by all known classes of compound. Tackifiers are, for example, hydrocarbon resins (for example polymers based on unsaturated $C_5$ or $C_9$ monomers), terpene phenolic resins, polyterpene resins based on raw materials such as, for example, α- or β-pinene, aromatic resins such as coumarone-indene resins or resins based on styrene or α-methylstyrene such as rosin and its derivatives, for example disproportionated, dimerized or esterified rosin, for example reaction products with glycol, glycerol or pentaerythritol, to name but a few. Preferred resins are those without readily oxidizable double bonds, such as terpene phenolic resins, aromatic resins, and more preferably resins produced by hydrogenation, such as hydrogenated aromatic resins, hydrogenated polycyclopentadiene resins, hydrogenated rosin derivatives or hydrogenated polyterpene resins, for example.

Preferred resins are those based on terpene phenols and rosin esters. Likewise preferred are tackifier resins having a softening point of more than 80° C. in accordance with ASTM E28-99 (2009). Particularly preferred resins are those based on terpene phenols and rosin esters having a softening point of more than 90° C. in accordance with ASTM E28-99 (2009). The resins are usefully employed in dispersion form. In that way they can easily be mixed in finely divided form with the polymer dispersion.

One particularly preferred embodiment of the invention, then, embraces a mixture of 2-ethylhexyl acrylate as monomer (a) and also ethyl acrylate as monomer (c) and terpene phenols and/or rosin esters having a softening point of more than 90° C. in accordance with ASTM E28-99 (2009).

To achieve further improvement in cable compatibility, the adhesive formulation may optionally be blended with light stabilizers or primary and/or secondary ageing inhibitors. Ageing inhibitors used may be products based on sterically hindered phenols, phosphites, thiosynergists, sterically hindered amines or UV absorbers.

Preference is given to using primary antioxidants such as, for example, Irganox 1010 or Irganox 254, alone or in combination with secondary antioxidants such as, for example, Irgafos TNPP or Irgafos 168.

These ageing inhibitors may be used in any desired combination with one another, with mixtures of primary and secondary antioxidants in combination with light stabilizers such as Tinuvin 213, for example, exhibiting particularly good ageing-inhibition effect.

Ageing inhibitors in which a primary antioxidant is united with a secondary antioxidant in one molecule have proved to be especially advantageous. These ageing inhibitors comprise cresol derivatives whose aromatic ring is substituted at two arbitrary, different locations, preferably in ortho- and meta-position relative to the OH group, by thioalkyl chains, it also being possible for the sulphur atom to be joined to the aromatic ring of the cresol building block via one or more alkyl chains. The number of carbon atoms between the aromatic moiety and the sulphur atom may be between 1 and 10, preferably between 1 and 4. The number of carbon atoms in the alkyl side chain may be between 1 and 25, preferably between 6 and 16. Particularly preferred in this context are compounds of the 4,6-bis(dodecylthiomethyl)-o-cresol, 4,6-bis(undecylthiomethyl)-o-cresol, 4,6-bis(decyl-thiomethyl)-o-cresol 4,6-bis(nonylthiomethyl)-o-cresol or 4,6-bis(octyl-thiomethyl)-o-cresol type. Ageing inhibitors of these kinds are available for example from the company Ciba Geigy under the name Irganox 1726 or Irganox 1520.

The amount of the ageing inhibitor or ageing inhibitor package added ought to be situated within a range between 0.1 and 10% by weight, preferably in a range between 0.2 and 5% by weight, more preferably in a range between 0.5 and 3% by weight, based on the overall solids content.

Preference is given to a presentation form in the form of a dispersion for particularly simple miscibility with the adhesive dispersion. Alternatively it is also possible for liquid ageing inhibitors to be incorporated directly into the dispersion, in which case the step of incorporation ought to be followed by a standing time of a number of hours, to allow the homogeneous distribution of the ageing inhibitor in the dispersion or its acceptance into the dispersion particles. A further alternative is the addition of an organic solution of the ageing inhibitors to the dispersion.

Suitable concentrations lie in the range from 0.1 up to 5 parts by weight, based on the solids.

For improving the processing properties, the adhesive formulation may further be blended with customary process auxiliaries such as rheological additives (thickeners), defoamers, deaerating agents, wetting agents or flow control agents. Suitable concentrations are in the range from 0.1 up to 5 parts by weight, based on the solids.

Fillers (reinforcing or non-reinforcing) such as silicon dioxides (spherical, acicular, platelet-shaped or irregular like the fumed silicas), glass in the form of solid or hollow beads, microballoons, calcium carbonates, zinc oxides, titanium dioxides, aluminium oxides or aluminium oxide hydroxides may serve for fine-tuning the processing properties and also the technical adhesive properties. Suitable concentrations are in the range from 0.1 up to 20 parts by weight, based on the solids.

In one preferred embodiment the adhesive formulation of the invention has a bond strength to steel in accordance with ASTM D3330 of at least 2.5 N/cm (for an adhesive coat-weight of about 100 g/m$^2$ on a woven polyester carrier, in accordance with the examples).

Suitable carriers include in principle all carrier materials, preferably textile carriers and more preferably woven fabrics, more particularly woven polyester fabrics.

As carrier material for the adhesive tape it is possible to use all known textile carriers such as knitted fabrics, scrims, tapes, braids, tufted textiles, felts, woven fabrics (encompassing plain weave, twill and satin weave), knitted fabrics (encompassing warp knits and other knits) or nonwoven webs, the term "nonwoven web" comprehending at least sheetlike textile structures in accordance with EN 29092 (1988) and also stitchbonded webs and similar systems.

It is likewise possible to use woven and knitted spacer fabrics with lamination.

Spacer fabrics of these kinds are disclosed in EP 0 071 212 B1. Spacer fabrics are mat-like layer structures comprising a cover layer of a fibre or filament web, an underlayer and individual retaining fibres or bundles of such fibres between these layers, these fibres being distributed over the area of the layer structure, being needled through the particle layer and joining the cover layer and the underlayer to one another. As an additional although not mandatory feature, the retaining fibres in accordance with EP 0 071 212 B1 contain particles of inert minerals, such as sand, gravel or the like, for example.

The retaining fibres needled through the particle layer hold the cover layer and the underlayer at a distance from one another and are joined to the cover layer and the underlayer.

Nonwovens contemplated include, in particular, consolidated staple fibre webs, but also filament webs, meltblown webs and spunbonded webs, which generally require additional consolidation. Possible consolidation methods known for webs include mechanical, thermal and chemical consolidation. Whereas with mechanical consolidations the fibres are held together purely mechanically usually by entanglement of the individual fibres, by the interlooping of fibre bundles or by the stitching-in of additional threads, it is possible by thermal and by chemical techniques to obtain adhesive (with binder) or cohesive (binderless) fibre-fibre bonds. Given appropriate formulation and an appropriate process regime, these bonds may be restricted exclusively, or at least predominantly, to fibre nodal points, so that a stable, three-dimensional network is formed while nevertheless retaining the relatively loose, open structure in the web.

Webs which have proved to be particularly advantageous are those consolidated in particular by overstitching with separate threads or by interlooping.

Consolidated webs of this kind are produced for example on stitchbonding machines of the "Malimo" type from the company Karl Mayer, formerly Malimo, and can be obtained from companies including Techtex GmbH. A Malifleece is characterized in that a cross-laid web is consolidated by the formation of loops from fibres of the web.

The carrier used may also be a web of the Kunit or Multilknit type. A Kunit web is characterized in that it originates from the processing of a longitudinally oriented fibre web to form a sheetlike structure which has loops on one side and has loop feet or pile fibre folds on the other side, but possesses neither threads nor prefabricated sheetlike structures. A web of this kind as well has been produced for a relatively long time, for example on stitchbonding machines of the "Malimo" type from the company Karl Mayer. A further characterizing feature of this web is that, as a longitudinal-fibre web, it is able to absorb high tensile forces in the longitudinal direction. The characteristic feature of a Multiknit web relative to the Kunit web is that the web is consolidated on both the top and bottom sides by virtue of the double-sided needle punching. The starting product used for a Multiknit is generally one or two single-sidedely interlooped pile fibre nonwovens produced by the Kunit process. In the end product, both top sides of the nonwovens are shaped by means of interlooped fibres to form a closed surface, and are joined to one another by fibres which stand almost perpendicularly. An additional possibility is to introduce further needlable sheetlike structures and/or scatterable media.

Finally, stitchbonded webs as an intermediate are also suitable for forming a liner of the invention and an adhesive tape of the invention. A stitchbonded web is formed from a nonwoven material having a large number of stitches extending parallel to one another. These stitches are brought about by the stitching-in or stitchbonding of continuous textile threads. For this type of web, stitchbonding machines of the "Malimo" type from the company Karl Mayer are known.

Also particularly suitable are needlefelt webs. In a needlefelt web, a tuft of fibres is made into a sheetlike structure by means of needles provided with barbs. By alternate introduction and withdrawal of the needles, the material is consolidated on a needle bar, with the individual fibres interlooping to form a firm sheetlike structure. The number and configuration of the needling points (needle shape, penetration depth, double-sided needling) determine the thickness and strength of the fibre structures, which are in general lightweight, air-permeable and elastic.

Also particularly advantageous is a staple fibre web which is mechanically preconsolidated in the first step or is a wet-laid web laid hydrodynamically, in which between 2% and 50% by weight of the web fibres are fusible fibres, more particularly between 5% and 40% by weight of the web fibres.

A web of this kind is characterized in that the fibres are laid wet or, for example, a staple fibre web is preconsolidated by the formation of loops from fibres of the web by needling, stitching or air-jet and/or water-jet treatment.

In a second step, thermofixing takes place, with the strength of the web being increased again by the melting, or partial melting, of the fusible fibres.

For the utilization of nonwovens in accordance with the invention, the adhesive consolidation of mechanically preconsolidated or wet-laid webs is of particular interest, it being possible for said consolidation to take place by way of the addition of binder in solid, liquid, foamed or paste-like form. A great diversity of theoretical presentation forms is possible: for example, solid binders as powders for trickling in; as a sheet or as a mesh; or in the form of binding fibres. Liquid binders may be applied as solutions in water or organic solvents, or as a dispersion. For adhesive consolidation, binding dispersions are predominantly selected: thermosets in the form of phenolic or melamine resin dispersions, elastomers as dispersions of natural or synthetic rubbers or, usually, dispersions of thermoplastics such as acrylates, vinyl acetates, polyurethanes, styrene-butadiene systems, PVC, and the like, and also copolymers thereof. Normally the dispersions are anionically or nonionically stabilized, although in certain cases cationic dispersions may also be of advantage.

The binder may be applied in a manner which is in accordance with the prior art and for which it is possible to consult, for example, standard works of coating or of nonwoven technology such as "Vliesstoffe" (Georg Thieme Verlag, Stuttgart, 1982) or "Textiltechnik-Vliesstofferzeugung" (Arbeitgeberkreis Gesamttextil, Eschborn, 1996).

For mechanically preconsolidated webs which already possess sufficient composite strength, the single-sided spray application of a binder is appropriate for producing specific changes in the surface properties.

Such a procedure not only is sparing in its use of binder but also greatly reduces the energy requirement for drying. Since no squeeze rolls are required and the dispersions remain predominantly in the upper region of the nonwoven, unwanted hardening and stiffening of the web can be largely prevented.

For sufficient adhesive consolidation of the web carrier, the addition of binder in the order of magnitude of 1% to 50%, more particularly 3% to 20%, based on the weight of the fibre web, is generally required.

The binder may be added as early as during the manufacture of the web, in the course of mechanical preconsolidation, or else in a separate process step, which may be carried out in-line or off-line. Following the addition of binder, it is necessary temporarily to generate a condition for the binder in which the binder becomes adhesive and adhesively connects the fibres—this may be achieved during the drying, for example, of dispersions, or else by means of heating, with further possibilities for variation existing by way of areal or partial application of pressure. The binder may be activated in known drying tunnels, given an appropriate selection of binder, or else by means of infra-red radiation, UV radiation, ultra-sound, high-frequency radiation or the like. For the subsequent end use it is sensible, though not absolutely necessary, for the binder to have lost its tack following the end of the web production process. It is advantageous that, as a result of thermal treatment, volatile components such as fibre assistants are removed, giving a web having favourable fogging values, so that when a low-fogging adhesive is used, it is possible to produce an adhesive tape having particularly favourable fogging values; accordingly, the liner as well has a very low fogging value.

By fogging (see DIN 75201 A) is meant the effect where, under unfavourable conditions, compounds of low molecular mass may outgas from the adhesive tapes and condense on cold parts. As a result of this it is possible, for example, for the view through the windscreen to be adversely affected.

A further special form of adhesive consolidation involves activating the binder by partial dissolution or partial swelling. In this case it is also possible in principle for the fibres themselves, or admixed speciality fibres, to take over the function of the binder. Since, however, such solvents are objectionable on environmental grounds, and/or are problematic in their handling, for the majority of polymeric fibres, this process is not often employed.

Advantageously and at least in regions, the carrier may have a single-sidedly or double-sidedly polished surface, preferably in each case a surface polished over the whole area. The polished surface may be chintzed, as elucidated in detail in EP 1 448 744 A1, for example.

Furthermore, the carrier may be compacted by calendering on a roll mill. The two rolls preferably run in opposite directions and at the same peripheral speed, causing the carrier to be pressed and compacted.

If there is a difference in the peripheral speed of the rolls, then the carrier is additionally polished.

Starting materials for the carrier material for the adhesive tape are more particularly (manmade) fibres (staple fibre or continuous filament) made from synthetic polymers, also called synthetic fibres, made from polyester, polyamide, polyimide, aramid, polyolefin, polyacrylonitrile or glass, (manmade) fibres made from natural polymers such as cellulosic fibres (viscose, Modal, Lyocell, Cupro, acetate, triacetate, Cellulon), such as rubber fibres, such as plant protein fibres and/or such as animal protein fibres and/or natural fibres made of cotton, sisal, flax, silk, hemp, linen, coconut or wool. The present invention, however, is not confined to the materials stated; it is instead possible, as evident to the skilled person without having to take an inventive step, to use a multiplicity of further fibres in order to produce the carrier.

Likewise suitable, furthermore, are yarns fabricated from the fibres specified.

In the case of woven fabrics or scrims, individual threads may be produced from a blend yarn, and thus may have synthetic and natural constituents. Generally speaking, however, the warp threads and the weft threads are each formed of a single kind.

The warp threads and/or the weft threads here may in each case be composed only of synthetic threads or only of threads made from natural raw materials—in other words, of a single kind.

Also suitable for the adhesive tape is a carrier material which consists of paper, of a laminate, of a film (for example PP, PE, PET, PA, PU), of foam or of a foamed film.

These non-textile sheetlike materials are especially appropriate when specific requirements necessitate such a modification of the invention. Films are generally thinner in comparison to textiles, for example, and, as a result of the imperforate layer, offer additional protection against penetration by chemicals and service fluids such as oil, petrol, antifreeze and the like into the actual cable area, and can be substantially adapted to requirements by an appropriate selection of the material from which they are constructed. With polyurethanes or polyolefin copolymers, for example, flexible and elastic jackets can be produced; with polyester and polyamides, good abrasion resistance and temperature stability are achieved.

Foams or foamed films, on the other hand, possess the qualities of more substantial space filling and of good soundproofing—where a length of cable is laid, for example, in a duct-like or tunnel-like area in the vehicle, a jacketing tape of appropriate thickness and soundproofing can prevent disruptive flapping and vibration from the outset.

The adhesive tape may ultimately have a liner material, with which the one or two layers of adhesive are lined before use. Suitable liner materials also include all of the materials set out comprehensively above.

It is preferred to use a non-linting material such as a polymeric film or a well-sized, long-fibre paper.

If the adhesive tape described is to be of low flammability, this quality can be achieved by adding flame retardants to the carrier and/or to the adhesive. These retardants may be organobromine compounds, if required with synergists such as antimony trioxide, although, with regard to the absence of halogen from the adhesive tape, preference will be given to using red phosphorus, organophosphorus compounds, mineral compounds or intumescent compounds such as ammonium polyphosphate, alone or in conjunction with synergists.

The general expression "adhesive tape" in the context of this invention encompasses all sheetlike structures such as two-dimensionally extended sheets or sheet sections, tapes with extended length and limited width, tape sections and the like, and also, lastly, diecuts or labels.

The adhesive tape may be produced in the form of a roll, in other words rolled up onto itself in the form of an archimedian spiral.

Applied to the reverse of the adhesive tape may be a reverse-face varnish, in order to exert a favourable influence on the unwind properties of the adhesive tape wound into the archimedian spiral. This reverse-face varnish may for this purpose be furnished with silicone compounds or fluorosilicone compounds and also with polyvinylstearylcarbamate, polyethyleneiminestearylcarbamide or organofluorine compounds as adhesive substances.

The adhesive may be applied in the longitudinal direction of the adhesive tape, in the form of a stripe, the width of the stripe being lower than that of the carrier of the adhesive tape.

Depending on the particular utility, there may also be a plurality of parallel stripes of the adhesive coated on the carrier material.

The position of the stripe on the carrier is freely selectable, with preference being given to an arrangement directly at one of the edges of the carrier.

The adhesive is preferably applied over the full area to the carrier.

Provided on the adhesive coating of the carrier there may be at least one stripe of a covering, extending in the longitudinal direction of the adhesive tape and covering between 20% and 90% of the adhesive coating.

The stripe preferably covers in total between 50% and 80% of the adhesive coating. The degree of coverage is selected according to the application and to the diameter of the cable loom.

The percentage figures indicated relate to the width of the stripes of the covering in relation to the width of the carrier.

In accordance with one preferred embodiment of the invention there is precisely one stripe of the covering present on the adhesive coating.

The position of the stripe on the adhesive coating is freely selectable, with preference being given to an arrangement directly at one of the longitudinal edges of the carrier. In this way an adhesive stripe is produced which extends in the longitudinal direction of the adhesive tape and finishes at the other longitudinal edge of the carrier.

Where the adhesive tape is used for jacketing a cable harness, by the adhesive tape being passed in a helicoidal movement around the cable harness, the wrapping of the cable harness may be accomplished by bonding the adhesive of the adhesive tape only to the adhesive tape itself, with the substrate not coming into contact with any adhesive. The cable harness jacketed in this way has a very high flexibility, as a result of the absence of fixing of the cable by any adhesive. Consequently the flexibility of said cable harness on installation—particularly in narrow passages or sharp bends—is significantly increased.

If a certain degree of fixing of the adhesive tape on the substrate is desired, the jacketing may be accomplished by bonding part of the adhesive stripe to the adhesive tape itself and another part to the substrate.

In accordance with another advantageous embodiment, the stripe is applied centrally on the adhesive coating, thereby producing two adhesive stripes extending on the longitudinal edges of the carrier in the longitudinal direction of the adhesive tape.

For the secure and economic application of the adhesive tape in said helicoidal movement around the cable harness, and to counter the slipping of the resultant protective wrapping, the two adhesive stripes each present on the longitudinal edges of the adhesive tape are advantageous, especially if one stripe, which is usually narrower than the second stripe, serves as a fixing aid and the second, broader stripe serves as a fastener. In this way, the adhesive tape is bonded to the cable in such a way that the cable harness is secured against slipping but is nevertheless of flexible design.

In addition there are embodiments in which more than one stripe of the covering is applied to the adhesive coating. Where reference is made only to one stripe, the skilled person reads this, conceptually, as accommodating the possibility that there may well be two or more stripes covering the adhesive coating at the same time.

The procedure for producing the adhesive tape of the invention involves nothing more than the coating of the carrier directly with the dispersion in one or more operations carried out in succession. In the case of textile carriers, the untreated textile can be coated directly or by a transfer process. Alternatively the textile may be pretreated with a coating (using any desired film-forming substance from solution, dispersion, melt and/or radiation-curing), before then being provided, in a downstream work-step, directly or by a transfer process, with the PSA.

Application assemblies used are the customary ones: wire doctor, coating bar, roll application, nozzle coating, twin-chamber doctor blade, multiple cascade die.

On the basis of the positive properties outlined, the adhesive tape can be used outstandingly for insulating and wrapping wires or cables.

Furthermore, it is advantageously suitable for the jacketing of elongate material such as, more particularly, cable looms in motor vehicles, with the adhesive tape being passed in a helical line around the elongate material, or the elongate material being wrapped in axial direction by the tape.

Lastly, the concept of the invention also embraces an elongate material jacketed with an adhesive tape of the invention. The elongate material is preferably a cable loom.

On account of the outstanding suitability of the adhesive tape, it can be used in a jacket that consists of a covering, where, at least in one edge region of the covering, the self-adhesive tape is present, and is bonded on the covering in such a way that the adhesive tape extends over one of the longitudinal edges of the covering, and preferably in an edge region which is narrow by comparison with the width of the covering.

One such product and also optimized embodiments thereof are disclosed in EP 1 312 097 A1. EP 1 300 452 A2, DE 102 29 527 A1 and WO 2006 108 871 A1 show ongoing developments for which the adhesive tape of the invention is likewise very suitable. The adhesive tape of the invention may also find use in a method of the kind disclosed by EP 1 367 608 A2.

Finally, EP 1 315 781 A1 and DE 103 29 994 A1 describe embodiments of adhesive tapes of a kind also possible for the adhesive tape of the invention.

With further preference the adhesive tape, in bonding to cables with PVC jacketing and to cables with polyolefin jacketing, does not destroy these systems when an assembly composed of cables and adhesive tape is, in accordance with LV 312, stored at temperatures above 100° C. for up to 3000 hours and then the cables are bent around a mandrel.

The adhesive tape of the invention is outstandingly suitable for the wrapping of cables, can be easily unwound for simple processing, exhibits little or no flagging, and exhibits no cable embrittlement even in the high temperature classes T3 and T4 over 3000 hours.

The purpose of the text below is to illustrate the adhesive tape using a number of figures, without wishing thereby to bring about a restriction of whatever kind.

Figure 1:
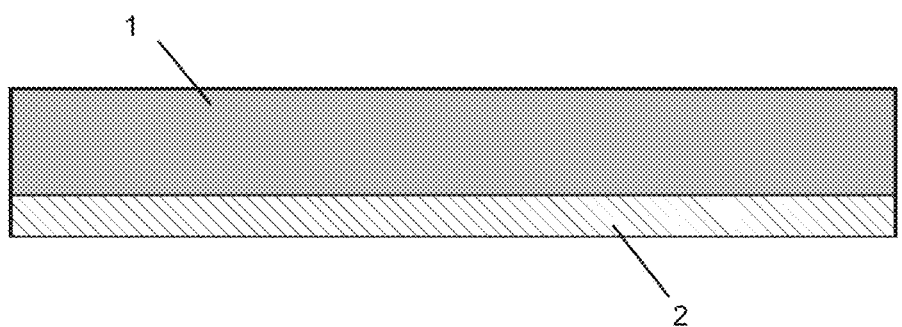
FIG. 1 shows one embodiment of an adhesive tape according to the present invention in a lateral section.

Shown in FIG. 1, in a section in the transverse direction (transverse section), is the adhesive tape, consisting of a woven fabric carrier 1, on one side of which a layer of a self-adhesive coating 2 is applied.

Figure 2:
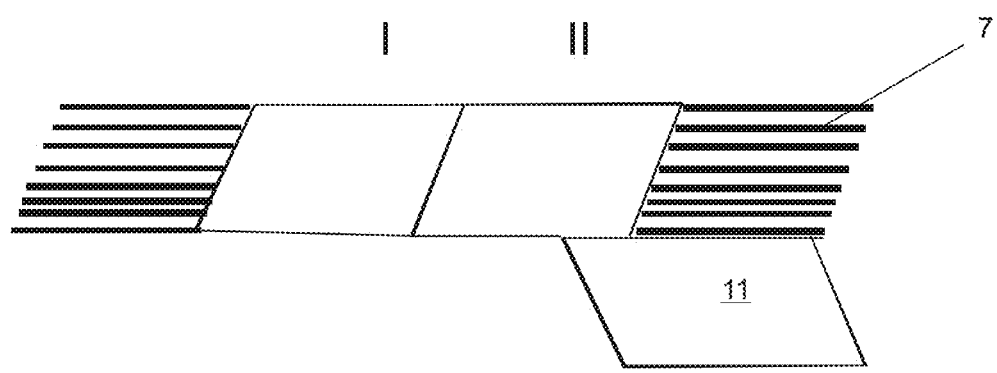
FIG. 2 shows a cut-out section of a cable harness which is composed of a bundle of individual cables and is jacketed with the adhesive tape of the invention.

FIG. 2 shows a cut-out section of a cable harness which is composed of a bundle of individual cables 7 and is jacketed with the adhesive tape 11 of the invention. The adhesive tape is passed in a helicoidal movement around the cable harness.

The cut-out section of cable harness shown has two turns I and II of the adhesive tape. Further turns would extend towards the left, but are not shown here.

Figure 3:
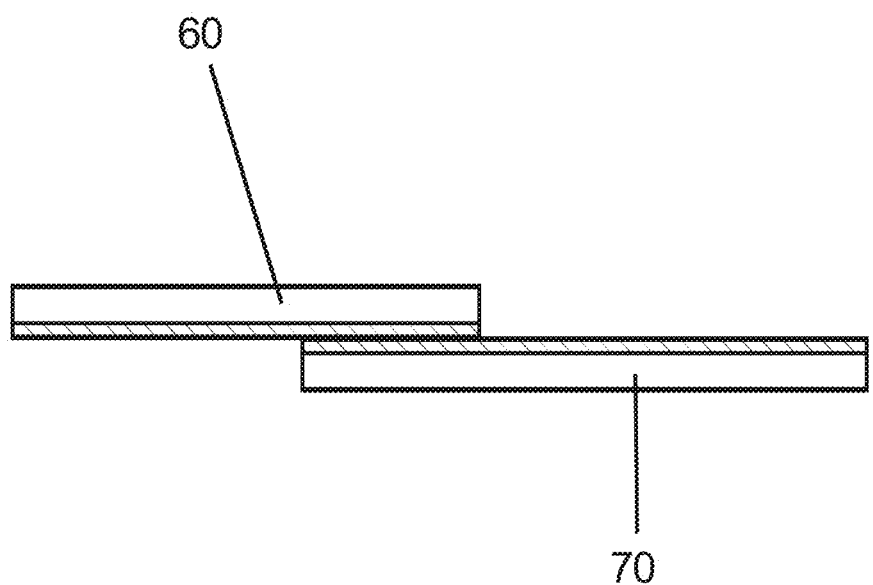
FIG. 3 shows an advantageous application of the adhesive tape.

In a further embodiment for jacketing, two tapes 60, 70 of the invention, furnished with an adhesive, are laminated with their adhesives at an offset (preferably by 50% in each case) to one another, producing a product as shown in FIG. 3.

EXAMPLES

Outline of the Examples

The adhesive tape of the invention is described below in a preferred embodiment by means of a number of examples, without wishing thereby to subject the invention to any restriction whatsoever.

In addition, comparative examples are given, which show unsuitable adhesive tapes.

To illustrate the invention, example adhesive tapes were produced according to the following scheme:

The PSA dispersions were mixed from polymer dispersion and resin dispersion in line with the example formulas, and were intimately homogenized using a stirrer. The PSA dispersions were subsequently adjusted, by stirred incorporation of a polyurethane associative thickener (Borchigel 0625, OMG Borchers), to a viscosity of approximately 5000 Pa*s at a shear rate of $0.01$ s$^{-1}$ (measured using cone/plate geometry in rotation mode with a DSR 200 N rheometer from Rheometric Scientific).

Using a film-drawing apparatus, a woven polyester fabric (linear fibre density 167 dtex, thread count warp 48.5 1/cm, thread count weft 23 1/cm) was coated with the thickened example PSA dispersion in such a way as to result, after drying in a forced-air oven at 85° C. for 5 minutes, in an adhesive coatweight of approximately 20 g/m$^2$.

In a second work-step, the fabric impregnated in this way was coated analogously with the same dispersion, so as to result, after drying in a forced-air oven at 85° C. for 10 minutes, in a total adhesive coatweight of 100 g/m$^2$.

Assessment Criteria

The criteria for an application-compatible adhesive tape for the wrapping of cables are
unwind force from rolls after storage at 40° C. for 4 weeks
flagging resistance as per the TFT test
cable compatibility according to LV 312

Procedure of the Tests

Unless expressly stated otherwise, the measurements are carried out under test conditions of 23±1° C. and 50±5% relative humidity.
Measurement of Unwind Force to LV312

Here, a value in the range from about 3 to 9 N/cm at a take-off speed of 30 m/min is considered to be compatible with the application and is scored as "1". Values outside the range receive a score of "0".
Measurement of Flagging Resistance to LV312 or TFT Method (Threshold Flagging Time)

Figure 4:
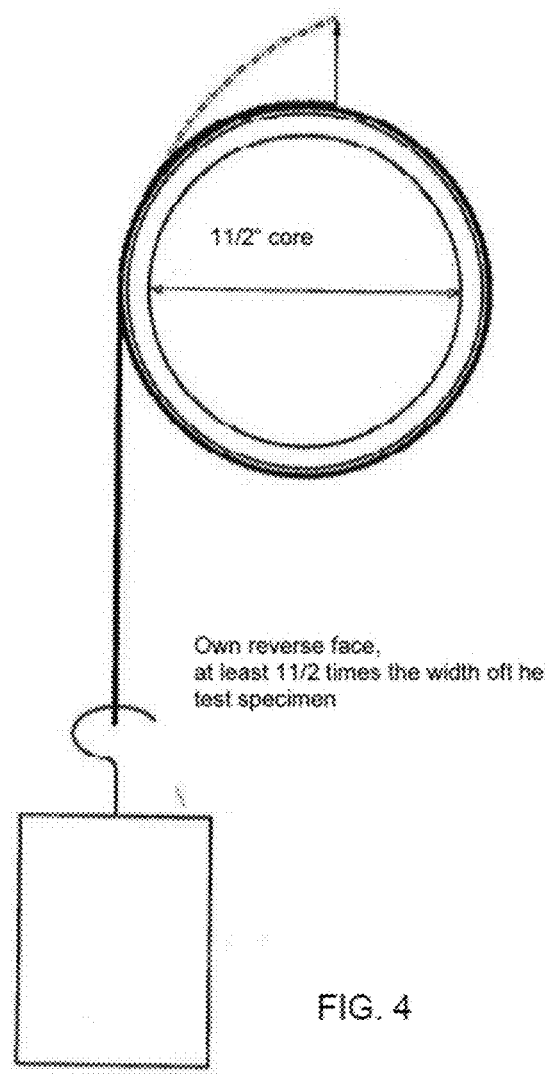
FIG. 4 shows a test specimen in schematic.

For determining the flagging behaviour by the TFT method, a test is employed in which an additional flexural stress is generated by the application of the test specimens, prepared in a flat format, to a 1½" core. The combination of tensile load by a test weight and flexural stress causes flagging-like detachment of the adhesive tape starting from the bonded upper end, and ultimate failure by dropping of the test specimens (see FIG. 4, which also shows the schematic construction).

The time in minutes before dropping is the result.

The critical parameters for the holding time of the test specimens are weight and temperature, the weight being selected such as to result in values of at least 100 minutes.

The cylindrically shaped test mandrel is a 1½" card core with an external diameter of 42±2 mm, provided with a marking line 5 mm adjacent to the vertex line.

The adhesion base is the adhesive tape's own reverse face.

The manual roller has a weight of 2 kg.

The test weight is 1 kg.

The test conditions are 23±1° C. and 50±5% relative humidity, or 40° C. in the heating cabinet.

The test is carried out on strips of adhesive tape 19 mm wide. A strip with a length of 400 mm is adhered to release paper and cut to form three strips with a length of 100 mm each. This should be done using a fresh cutter blade. The reverse face must not be touched.

Figure 5:
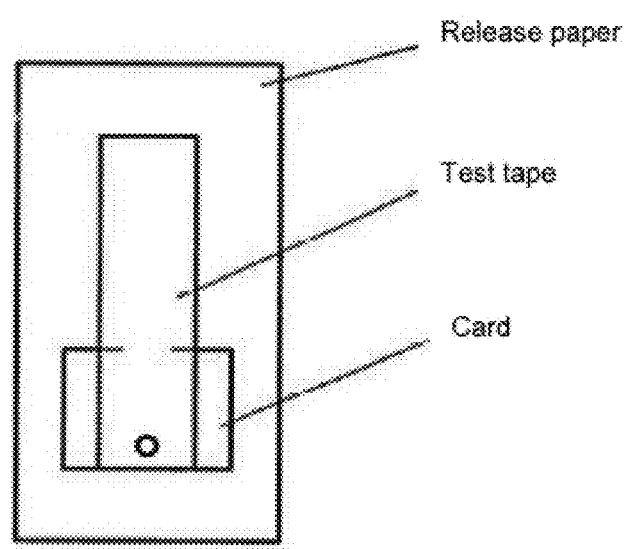
FIG. 5 shows a test specimen with the assembly perforated.

A small piece of card is adhered beneath one of the ends of each strip, and the assembly is perforated (see FIG. 5).

Figure 6:
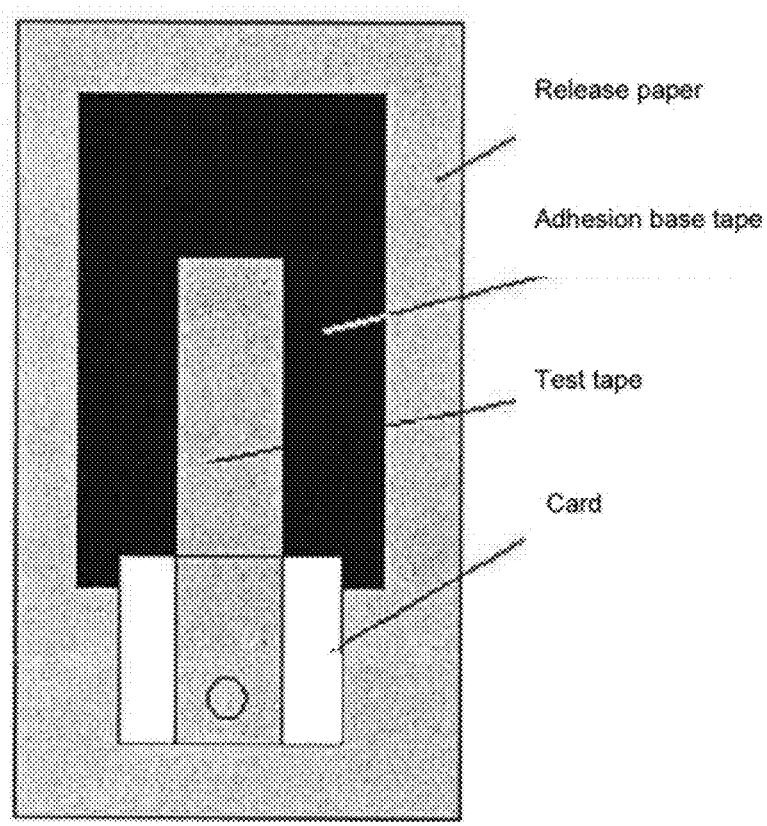
FIG. 6 shows a test specimen bonded centrally to strips of a broader adhesion base so that the small piece of card still overlaps just at the end.

The test strips are then individually bonded centrally to strips of the broader adhesion base (adhesive tape with a width 1% times that of the adhesive tape under test), so that the small piece of card still overlaps just (2 to 3 mm) at the end (see FIG. 6).

The test specimens are rolled down using the 2 kg manual roller at a rate of 10 m/min in 3 cycles.

Figure 7:
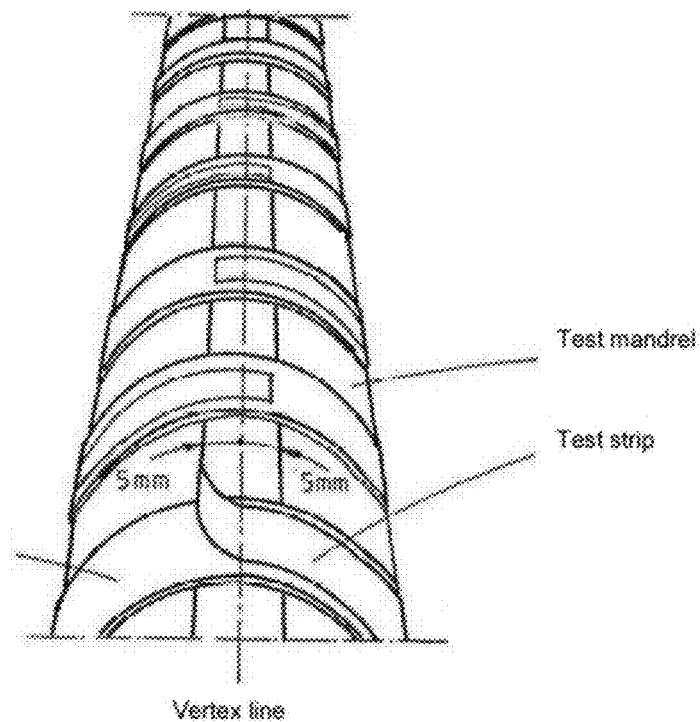
FIG. 7 shows the finished test samples, in other words the test strips together with adhesion base adhered to the card core in such a way that the upper end of the test specimen overaps the vertex point by a small amount.

The finished test samples, in other words the test strips together with adhesion base, are then adhered to the card core in such a way that the upper end of the test specimen overaps the vertex point by 5 mm (see FIG. 7). In this operation, only the adhesion base, and not the test specimen, must be pressed on.

The test specimens fully prepared are left for 20±4 hours without weight loading in a controlled-climate chamber at 40° C.

Weights with a mass of one kilogram are then hung onto the specimens, and the stopwatches are started.

The measurement ends after failure of all three test specimens of one sample.

The median of the three individual measurements is reported in minutes.

The holding time is reported in minutes.

In this context, a TFT value of >1200 minutes is considered to be a lower limit with regard to resistance to flagging. Values below this receive a score of 0, values from 1201 to 2000 minutes receive a score of 1, values from 2001 to 5000 minutes receive a score of 2, and values above 5001 minutes receive a score of 3. These gradations reflect increasing security against flagging.
Measurement of Cable Compatibility to LV312

Cable compatibility is considered to exist when there is no embrittlement after 3000 hours at 150° C. on bending around a mandrel with a diameter of 2 mm, and this is given a score of "1". Values outside this receive a score of "0".

Measurement of Bond Strength

For measuring the bond strength of the pure dispersions, coated-out samples of the adhesives were prepared first of all. For this purpose, the dispersions were applied to a PET film (polyethylene terephthalate) with a thickness of 23 µm, and were drawn down using a film-drawing apparatus in such a way as to result, after drying for 5 minutes at 105° C. in a forced-air drying cabinet, in an adhesive coatweight of 30 g/m$^2$.

Using a cutter knife, strips 20 mm wide and 25 cm long were cut from this sheet.

For measuring the bond strength of the formulations with resin, coated-out samples were drawn down as described above onto woven polyester fabrics, and likewise cut using a cutter knife into strips 20 mm wide and 25 cm long.

The bond strength to steel was measured in accordance with ASTM D3330.

Measurement of Glass Transition Temperatures

The glass transition temperatures were determined on the DSC 204 F1 "Phönix" Dynamic Differential Scanning calorimeter from Netzsch, Germany, in 25 µl aluminium crucibles with a perforated lid, under a nitrogen atmosphere (20 ml/min gas flow rate). The initial sample mass was 8±1 mg.

The samples were subjected to measurement twice from −140° C. to 200° C., with a heating rate of 10 K/min. The subject analysis was the 2nd heating curve.

The method is based on DIN 53 765.

Composition of Example Polymer Dispersions

To illustrate the concept of the invention, polymer dispersions having the following comonomer composition were trialled:

| Monomer | Polymer 1 | Polymer 2 | Polymer 3 |
|---|---|---|---|
| 2-Ethylhexyl acrylate | 50 | 81 | — |
| Butyl acrylate | — | — | 84 |
| Acrylic acid | 2 | 1 | 1 |
| Ethyl acrylate | 48 | — | — |
| Methyl methacrylate | — | 18 | 8 |
| Vinyl acetate | — | — | 7 |

The bond strengths to steel of polymers 1 to 3 were measured as follows (figure in N/cm):

| Polymer 1 | Polymer 2 | Polymer 3 |
|---|---|---|
| 2.7 | 1.3 | 2.6 |

The glass transition temperatures of polymers 1 to 3 were measured as follows (figure in ° C.):

| Polymer 1 | Polymer 2 | Polymer 3 |
|---|---|---|
| −35 | −38 | −31 |

Polymer 1 was used to formulate the pressure-sensitive adhesives (PSAs) listed in Table 1, by blending with dispersions of tackifier resin. The number here indicates the parts by weight of tackifier relative to 100 parts by weight of polymer 1 (based in each case on solids).

TABLE 1

Adhesive formulations from polymer 1

| Tackifier type | Softening point ° C. | Inventive examples B1 | B2 | B3 | Comparative examples V1 | V2 | V3 |
|---|---|---|---|---|---|---|---|
| Rosin ester resin Snowtack 100G, Lawter | 99 | 45 | | | | 10 | |
| Rosin ester resin Snowtack 780 G, Lawter | 83 | | 40 | | | | |
| Rosin acid resin Snowtack 781A*, Lawter | 69 | | | | | | 40 |
| Terpene phenolic resin Dermulsene TR 602, DRT | 96 | | | 35 | | | |

*Former designation: Snowtack SE 380.

Serving as Inventive examples B4 and B5 are polymers 2 and 3, in each case blended with 40 parts by weight of the rosin ester resin Snowtack 100G with a softening point of 99° C.

Counter-example V4 is the acrylate dispersion Primal PS 83 D from the manufacturer Dow Chemical Company, blended with 8 parts by weight of Snowtack 781A, with the former designation Snowtack SE 380. This example relates to Inventive example 1 of DE 44 19 169 A1.

The bond strengths to steel of Inventive examples B1 to B5 and also of Counter-examples V1 to V4 were measured as follows (figure in N/cm):

| B1 | B2 | B3 | B4 | B5 | V1 | V2 | V3 | V4 |
|---|---|---|---|---|---|---|---|---|
| 4.7 | 4.0 | 4.6 | 2.9 | 3.5 | 2.3 | 2.2 | 1.7 | 2.1 |

The glass transition temperatures of the pressure-sensitive adhesive formulations of Inventive examples B1 to B5 and also of Counter-examples V1 to V4 were measured as follows (figure in ° C.):

| B1 | B2 | B3 | B4 | B5 | V1 | V2 | V3 | V4 |
|---|---|---|---|---|---|---|---|---|
| −21 | −23 | −25 | −22 | −13 | −25 | −29 | −35 | −37 |

Table 3 sets out the test results for the example specimens:

TABLE 3

| | Inventive examples | | | | | Comparative examples | | | |
|---|---|---|---|---|---|---|---|---|---|
| | B1 | B2 | B3 | B4 | B5 | V1 | V2 | V3 | V4 |
| Unwind force | 1 | 1 | 1 | 1 | 1 | 1 | 1 | 1 | 1 |
| Flagging resistance | 3 | 2 | 3 | 1 | 2 | 0 | 0 | 0 | 0 |
| Cable compatibility | 1 | 1 | 1 | 1 | 1 | 1 | 1 | 1 | 1 |

All three test criteria are vital for an application-compatible adhesive tape for cable jacketing. The inventive examples therefore show adhesive tapes which conform to the concept of the invention; the comparative examples, in contrast, are unsuitable.

The invention claimed is:

1. A method of using an adhesive tape for jacketing elongate material, said method comprising either passing the adhesive tape in a helical line around the elongate material, or wrapping the elongate material in an axial direction with the adhesive tape, wherein the adhesive tape consists of (A) a textile carrier selected from the group consisting of polyester woven fabrics and (B) a pressure-sensitive adhesive that is applied on at least one side of the textile carrier, the pressure-sensitive adhesive comprising a dried mixture of two components A and B, wherein component A is a dispersion of a polymer and component B is a dispersion of at least one tackifier resin having a softening point of more than 80° C. in accordance with ASTM E28-99 (2009), the polymer being synthesized from:
   a) 40% to 90% by weight of n-butyl acrylate and/or 2-ethylhexyl acrylate,
   b) 0% to 10% by weight of an ethylenically unsaturated monomer selected from the group consisting of acrylic acid and methacrylic acid, and
   c) 60% to 10% by weight of one or more ethylenically unsaturated monofunctional monomers selected from the group consisting of (i) alkyl (meth)acrylates different from (a) and (ii) vinyl acetate,
   the total of a)+b)+c) totalling 100% by weight of the polymer,
   the pressure-sensitive adhesive comprising in the dried mixture between 15 and 100 parts by weight of the tackifier relative to 100 parts by weight of the polymer, and the adhesive tape exhibiting unwind force compatibility and cable compatibility in accordance with LV 312-1 (October/2009) and an increased resistance to flagging score in accordance with the TFT method when adhered to a substrate compared to a comparison adhesive tape adhered to the same substrate under the same bonding conditions, said comparison adhesive tape being identical in all respects to the adhesive tape except that the comparison adhesive tape lacks any tackifier resin having a softening point of more than 80° C. in accordance with ASTM E28-99 (2009).

2. The method according to claim 1,
wherein
ethyl acrylate forms the monomer (c) or at least part of the monomers (c).

3. The method according to claim 1,
wherein
2-ethylhexyl acrylate forms monomer (a).

4. The method according to claim 1, wherein
the monomer (a) consists of 2-ethylhexyl acrylate and at the same time the monomer (c) or at least part of the monomers (c) consists of ethyl acrylate.

5. The method according to claim 1, wherein
20 to 80 parts by weight of tackifiers have been added.

6. The method according to claim 1, wherein
the pressure-sensitive adhesive according to ASTM D3330 has a bond strength to steel of at least 2.5 N/cm (for an adhesive coatweight of 100 g/m$^2$ on a woven polyester fabric carrier).

\* \* \* \* \*